US011206767B2

(12) United States Patent
Thorne et al.

(10) Patent No.: US 11,206,767 B2
(45) Date of Patent: Dec. 28, 2021

(54) MODULAR PLANTING TRAY AND VERTICAL WALL PLANTING SYSTEM

(71) Applicant: GSky Plant Systems, Inc., Delray Beach, FL (US)

(72) Inventors: Harold F Thorne, Boynton Beach, FL (US); Takashi Sawada, Vancouver (CA)

(73) Assignee: GSky Plant Systems, Inc., Delray Beach, FL (US)

( * ) Notice: Subject to any disclaimer, the term of this patent is extended or adjusted under 35 U.S.C. 154(b) by 244 days.

(21) Appl. No.: 16/368,124

(22) Filed: Mar. 28, 2019

(65) Prior Publication Data

US 2020/0305355 A1 Oct. 1, 2020

(51) Int. Cl.
*A01G 9/02* (2018.01)
*A01G 27/00* (2006.01)

(52) U.S. Cl.
CPC ........... *A01G 9/025* (2013.01); *A01G 27/003* (2013.01); *A01G 27/005* (2013.01); *A01G 27/008* (2013.01)

(58) Field of Classification Search
CPC .............................. A01G 27/003; A01G 27/008
USPC ........................................................ 285/921
See application file for complete search history.

(56) References Cited

U.S. PATENT DOCUMENTS

| 1,993,620 | A |  | 3/1935 | Otwell |  |
| 2,022,548 | A |  | 11/1935 | Otwell |  |
| 2,078,488 | A | * | 4/1937 | Farnham | B65D 85/324 |
|  |  |  |  |  | 206/521.15 |
| 2,858,224 | A | * | 10/1958 | Darrah | B65D 81/2076 |
|  |  |  |  |  | 206/521.1 |
| 3,009,291 | A |  | 11/1961 | Blackmore |  |
| 3,034,696 | A | * | 5/1962 | Swanson | B65D 85/325 |
|  |  |  |  |  | 206/521.15 |
| 3,219,254 | A | * | 11/1965 | Hall | B65D 85/327 |
|  |  |  |  |  | 206/521.15 |
| 3,231,300 | A | * | 1/1966 | Moroney | F16B 9/056 |
|  |  |  |  |  | 403/163 |
| 3,914,061 | A | * | 10/1975 | Meyer | F16B 2/22 |
|  |  |  |  |  | 403/197 |
| 4,005,883 | A | * | 2/1977 | Guest | F16L 37/0845 |
|  |  |  |  |  | 285/322 |

(Continued)

FOREIGN PATENT DOCUMENTS

| DE | 3420037 A1 * | 12/1985 | ............ A01G 9/025 |
| ES | 1028463 U | 1/1995 |  |
| KR | 101009461 B1 | 1/2011 |  |

*Primary Examiner* — Brady W Frazier
*Assistant Examiner* — Zoe Tam Tran
(74) *Attorney, Agent, or Firm* — Christopher & Weisberg, P.A.

(57) ABSTRACT

A vertical wall display system for displaying potted plants includes trays that have a base portion and a back portion disposed at an acute angle with respect to each other. The base portion of the tray defines a plurality of niches in a linear array for receiving potted plants, each niche defines a reservoir capable of retaining a predetermined volume of a fluid. The back portion of the tray includes connecting elements for connecting the back portion of one tray with the back portion of a second tray so that the trays are substantially co-planar. Each of the trays define at least two sections that are joined so at to be separable into discrete sections that include different numbers of niches.

20 Claims, 8 Drawing Sheets

(56) References Cited

U.S. PATENT DOCUMENTS

| | | | | |
|---|---|---|---|---|
| 4,057,932 A * | 11/1977 | Spencer | | A01G 9/0295 47/77 |
| 4,255,896 A * | 3/1981 | Carl | | A01G 31/06 47/62 C |
| 4,295,296 A * | 10/1981 | Kinghorn | | A01G 9/025 47/82 |
| 4,332,105 A * | 6/1982 | Nir | | A01G 31/02 47/1.01 R |
| 4,380,136 A * | 4/1983 | Karpisek | | A01G 9/023 47/39 |
| 4,561,208 A * | 12/1985 | Schultz | | A01G 9/023 211/189 |
| 4,610,468 A * | 9/1986 | Wood | | F16L 37/0982 285/307 |
| 4,802,697 A * | 2/1989 | Bartholomew | | F16L 37/098 285/319 |
| 4,896,456 A * | 1/1990 | Grant | | A01G 9/024 47/67 |
| 4,953,719 A * | 9/1990 | Spamer | | A47B 87/0223 211/188 |
| 4,962,855 A * | 10/1990 | Holmquist | | B65D 1/36 206/423 |
| D323,415 S * | 1/1992 | Iverson | | D11/156 |
| D323,416 S * | 1/1992 | Iverson | | D11/156 |
| 5,096,232 A * | 3/1992 | Fond | | F16L 41/14 285/55 |
| 5,367,823 A * | 11/1994 | Ferris | | A47F 7/0078 47/39 |
| 5,409,127 A * | 4/1995 | Stratford | | B65D 1/30 220/23.4 |
| 5,502,922 A * | 4/1996 | Shlomo | | A01G 9/023 47/39 |
| 5,667,257 A * | 9/1997 | Butler | | F28F 9/0256 285/212 |
| 5,826,375 A | 10/1998 | Black | | |
| 6,158,587 A * | 12/2000 | Emery | | B65D 5/4803 206/427 |
| 6,405,481 B1 * | 6/2002 | Bautner | | A01G 9/0295 47/77 |
| 6,502,350 B1 * | 1/2003 | Dick | | A01G 31/06 47/62 R |
| 6,615,542 B2 * | 9/2003 | Ware | | A01G 9/023 47/83 |
| 7,080,482 B1 * | 7/2006 | Bradley | | A01G 31/02 47/60 |
| 7,243,460 B2 * | 7/2007 | Darlington | | F24F 3/16 47/62 R |
| 7,627,983 B1 * | 12/2009 | Deutsch-Aboulmahassine | | A01G 9/025 47/83 |
| 7,877,927 B2 | 2/2011 | Roy et al. | | |
| 8,215,053 B1 * | 7/2012 | Ohran | | A01C 1/02 47/2 |
| D666,123 S | 8/2012 | Sichello | | |
| 8,245,443 B1 | 8/2012 | Caruso | | |
| 8,250,804 B2 * | 8/2012 | Chang | | A01G 9/025 47/39 |
| 8,418,403 B1 * | 4/2013 | Nuttman | | A01G 9/024 47/82 |
| 8,429,852 B1 * | 4/2013 | Fula | | A01G 9/026 47/66.3 |
| 8,904,705 B2 * | 12/2014 | Downs, Sr. | | A01G 31/02 47/62 A |
| D720,947 S * | 1/2015 | Meyer | | D6/558 |
| 9,004,298 B2 * | 4/2015 | Sichello | | A01G 9/025 211/85.23 |
| 9,043,962 B2 * | 6/2015 | Trofe | | A01G 9/247 |
| 9,205,950 B2 * | 12/2015 | Roesler | | B65D 1/30 |
| 9,307,701 B2 * | 4/2016 | Gosling | | A01G 27/04 |
| 9,374,947 B2 * | 6/2016 | Meyer | | A01G 9/025 |
| 9,420,750 B2 * | 8/2016 | Ito | | A01G 9/02 |
| 9,420,768 B2 * | 8/2016 | Kasner | | A01K 63/045 |
| 9,445,550 B2 * | 9/2016 | Collis | | A01G 9/023 |
| 9,468,156 B2 | 10/2016 | Sichello | | |
| 9,604,749 B2 * | 3/2017 | Ferry | | B65D 77/2024 |
| D787,148 S * | 5/2017 | Orschulik | | D34/35 |
| D793,252 S * | 8/2017 | Prince | | D9/755 |
| 9,730,398 B2 | 8/2017 | Halmos et al. | | |
| 9,795,090 B2 | 10/2017 | Nilsson et al. | | |
| 9,807,949 B2 * | 11/2017 | Hamlin | | A01G 27/003 |
| 9,844,188 B2 * | 12/2017 | Legerton | | A01G 9/033 |
| 9,986,694 B2 * | 6/2018 | Billingsley | | A01G 9/023 |
| D831,178 S * | 10/2018 | Van Wingerden | | A01G 9/047 D23/267 |
| D833,829 S * | 11/2018 | Hertaus | | D7/600.1 |
| 10,555,464 B1 * | 2/2020 | Leeworthy | | A01G 9/02 |
| 10,694,684 B2 * | 6/2020 | Jarvinen | | A01G 9/025 |
| 2006/0043038 A1 * | 3/2006 | Wetzel | | A47G 7/044 211/88.03 |
| 2007/0157513 A1 | 7/2007 | Varney et al. | | |
| 2007/0295721 A1 * | 12/2007 | Van Handel | | B65D 21/0233 220/23.6 |
| 2009/0000189 A1 * | 1/2009 | Black | | A01G 27/02 47/82 |
| 2010/0146855 A1 | 6/2010 | Ma | | |
| 2010/0269409 A1 | 10/2010 | Johnson | | |
| 2011/0258925 A1 * | 10/2011 | Baker | | A01G 9/023 47/65.8 |
| 2012/0227320 A1 * | 9/2012 | Dos Santos | | A01G 27/005 47/79 |
| 2016/0212953 A1 * | 7/2016 | Janssen | | A01G 27/003 |
| 2016/0235023 A1 | 8/2016 | Thoma | | |
| 2018/0139915 A1 | 5/2018 | Au | | |

* cited by examiner

MODULAR PLANTING TRAY AND VERTICAL WALL PLANTING SYSTEM

FIELD

The present technology is generally related to aesthetic displays and architectural features including plants.

BACKGROUND

Plants are grown and displayed in many types and sizes of pots, trays and combinations thereof (generally "containers"). Most commonly, the containers are placed on the ground, stands, tables and other horizontal surfaces. It is also known to arrange the containers vertically on portable stands or an installed or anchored structure. When the containers are placed vertically, in a wall-like manner, it can create a pleasant aesthetic effect. However, to present the full aesthetic beauty of the plants and conceal the pots, it is known to place the pots at an angle as shown in U.S. Pat. No. 9,468,156, incorporated by reference herein. As shown in the '156 patent, a number of trays can be locked together and mounted to a wall for displaying potted plants. While this is an excellent system, the rise in popularity of green walls has presented challenges that require additional types of display equipment.

One of the challenges is that some installations require the incorporation or avoidance of existing architectural elements like windows, pipes, beams, etc. on an installation surface (e.g., a wall). Existing containers are a predetermined size to accommodate a predetermined number of potted plants of a specific size over a predetermined length. For different sizes and lengths, different containers are required. Thus, for a specific installation, a variety of different containers need to be delivered to a jobsite as no customization of a container is possible. For example, sawing a container in half might destroy its structural integrity, irrigation and drainage features. Additionally, manufacturing cost is higher to make multiple containers of different dimensions compared to a single size. Similarly, product ordering, inventory management, and logistics are more complicated for multiple items.

SUMMARY

The present invention provides a plant tray, and a vertical wall plant display system that includes multiple trays, and a method of creating a vertical wall plant display with aesthetic design features.

One aspect, the disclosure provides a tray for displaying potted plants as part of a vertical wall plant display system. The tray includes a base portion and a back portion disposed at an acute angle with respect to each other. The base portion of the tray defines a niches in a linear array for receiving a plurality of potted plants, each niche defining a reservoir capable of retaining a predetermined volume of a fluid. The back portion of the tray includes connecting elements for connecting the back portion of first tray with the back portion of a second tray so that the back portion of the first tray and the back portion of the second tray are substantially co-planar. The tray is divisible into at least two sections, each section having at least one niche, the sections joined so as to be separable into discrete sections.

In another aspect, the present disclosure provides a vertical wall display system for displaying potted plants includes trays that have a base portion and a back portion disposed at an acute angle with respect to each other. The base portion of the tray defines a plurality of niches in a linear array for receiving potted plants, each niche defines a reservoir capable of retaining a predetermined volume of a fluid. The back portion of the tray includes connecting elements for connecting the back portion of one tray with the back portion of a second tray so that the trays are substantially co-planar. Each of the trays define at least two sections that are joined so as to be separable into discrete sections that include different numbers of niches.

In yet another aspect, the disclosure provides a method of creating a green wall plant display including the steps of: determining an aesthetic pattern of a specific size and shape; providing trays that define niches; sizing each tray in accordance with the determined aesthetic pattern; joining the trays; securing the joined trays to a support structure; providing potted plants; and associating a specific potted plant with each niche thereby creating the aesthetic pattern.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
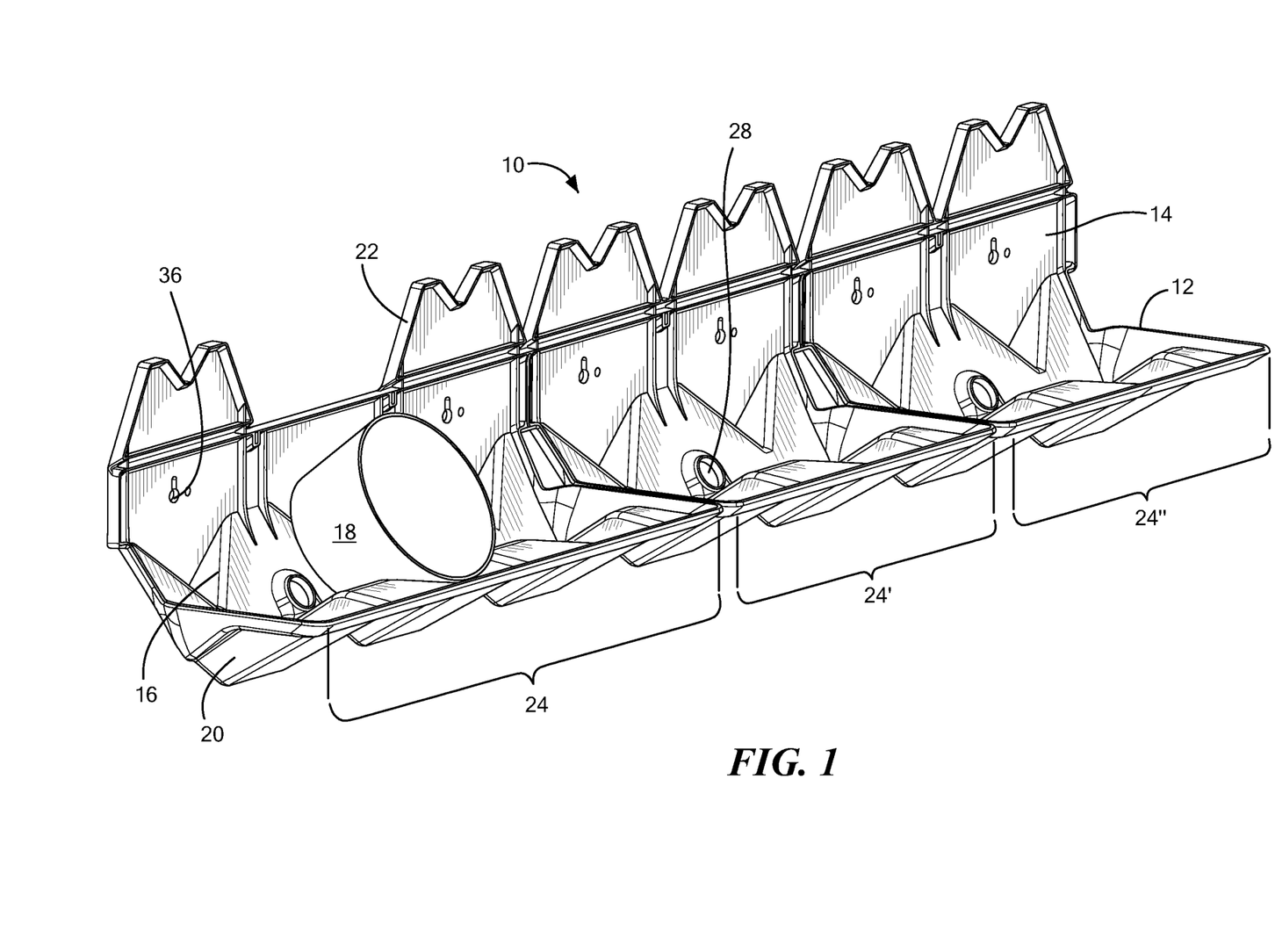
FIG. 1 is front perspective view of a planting tray in accordance with the invention.
Figure 6:
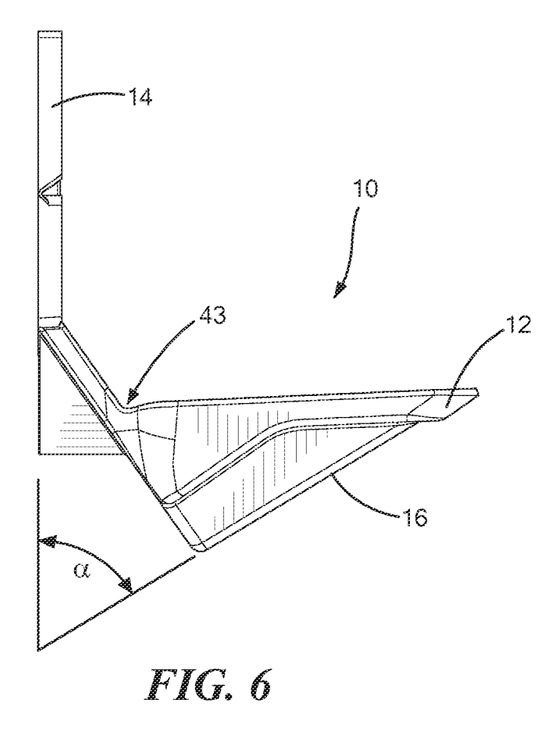
FIG. 6 is a left side view thereof.

FIG. 1 is front perspective view of a planting tray 10 in accordance with the invention. The planting tray 10 includes a base portion 12 and a back portion 14 disposed at an acute angle with respect to each other. This is shown more clearly in FIGS. 6 and 7, which are left and right side views of the planting tray 10, respectively, wherein a plane formed by the bottom of the niche 16 of the base portion 12 is at an acute angle with respect to a plane formed by the back portion 14. Similarly, a plane defined by the upper portion or top of the niche 16 of the base portion 12 is at an acute angle with a plane formed by the back portion 14.

Figure 8:
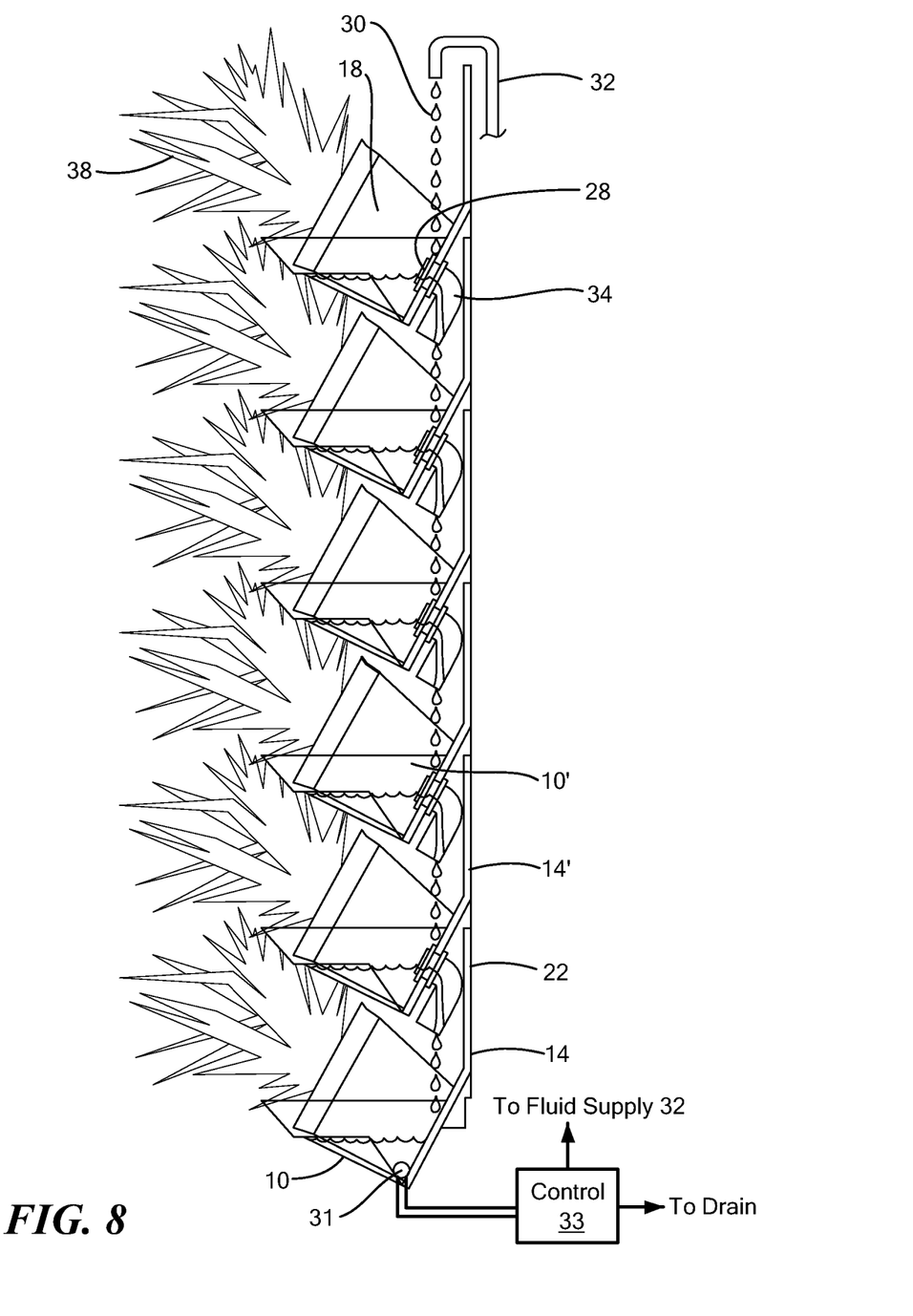
FIG. 8 is a side view of multiple trays that are connected and in which potted-plants have been placed.

The base portion 12 defines a number of niches 16 in a linear array for receiving and retaining pots, potted-plants, and/or other aesthetic elements. An exemplary empty pot 18 is shown positioned in a niche 16. Each niche 16 defines a reservoir 20 capable of retaining a predetermined volume of a fluid such as water, a plant nutrient, a fragrance element, a lighting element and/or other aesthetic elements. The back portion 14 of the tray 10 includes connecting elements 22 for connecting the back portion 14 of first tray 10 with the back portion 14' of a second tray 10', as shown in FIG. 8, so that the back portion of the first tray and the back portion of the second tray are substantially co-planar.

Figure 2:
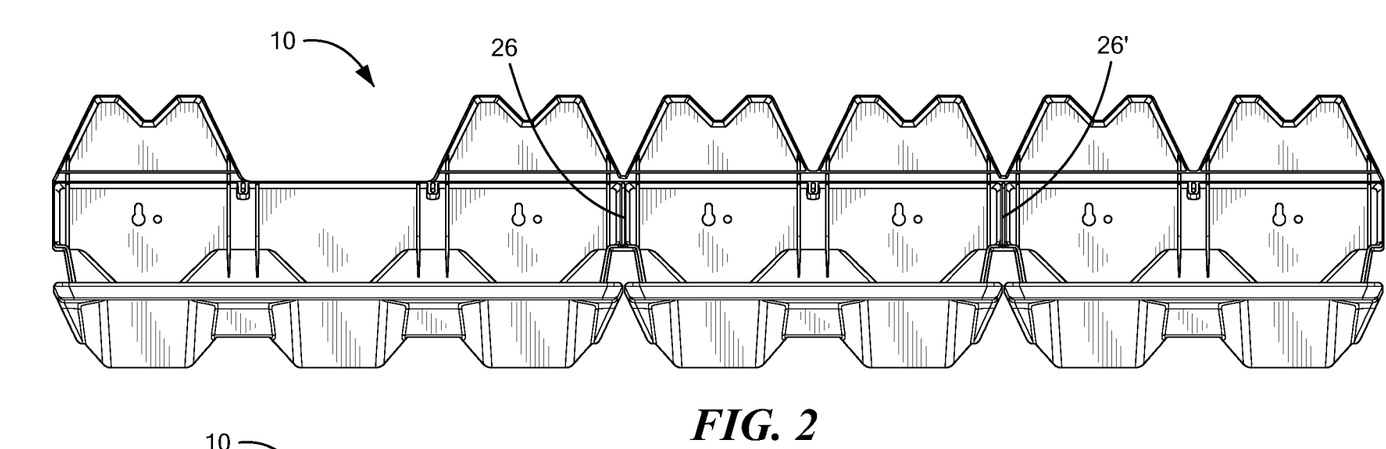
FIG. 2 is a front view thereof.
Figure 3:
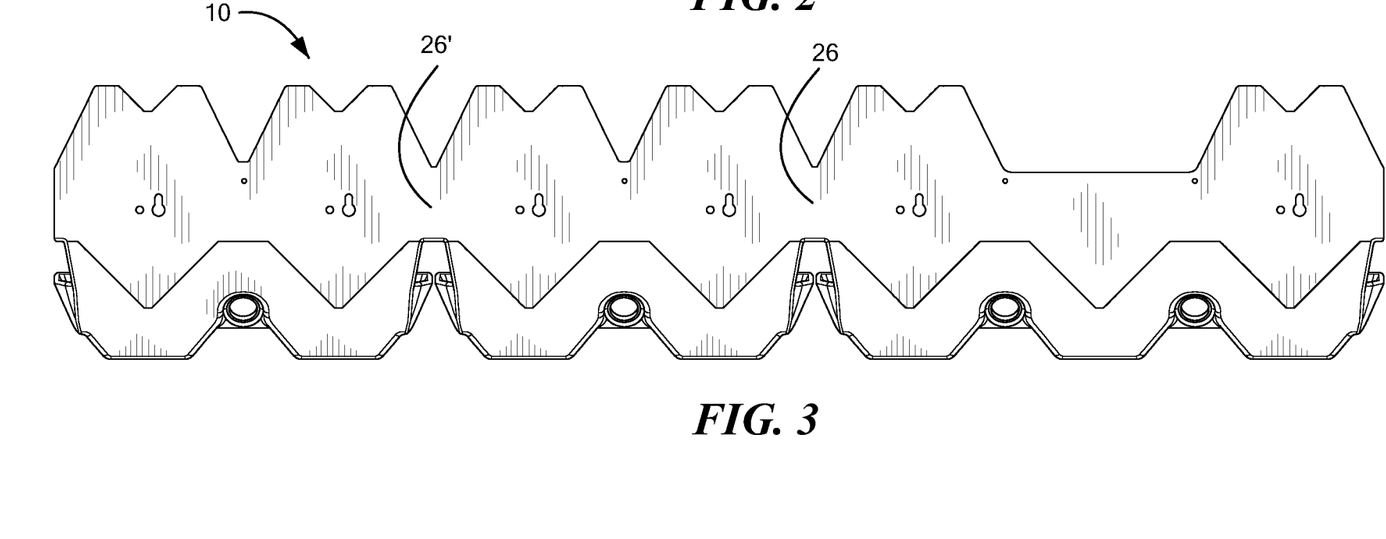
FIG. 3 is a rear view thereof.
Figure 4:
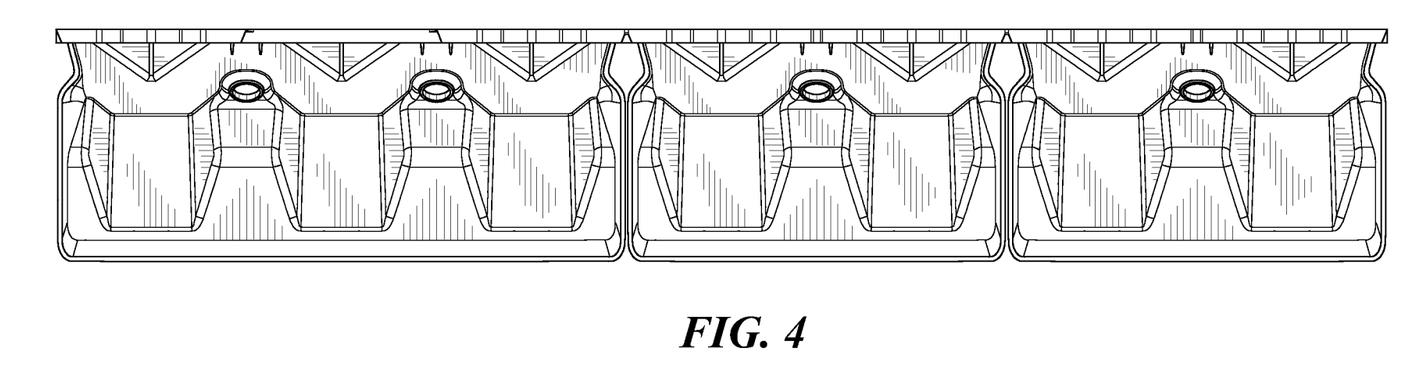
FIG. 4 is a top view thereof.
Figure 5:
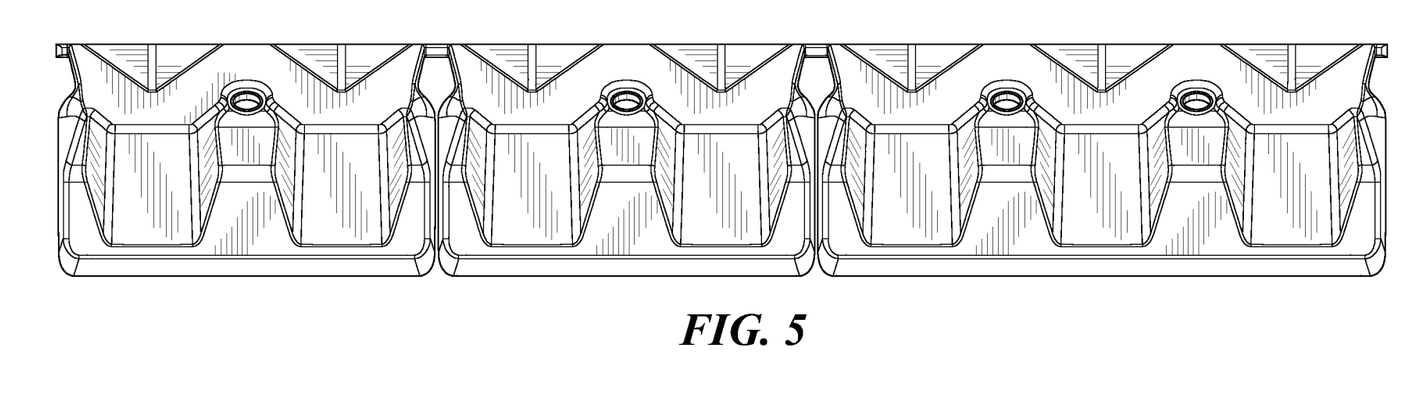
FIG. 5 is a bottom view thereof.

Continuing to refer to FIG. 1, the tray 10 is configured in sections 24, 24', 24", and each section includes at least one niche 16. In the illustrated embodiment there are three niches in section 24, and two niches in each of sections 24' and 24". While visible in many figures, front and back views of the tray 10, namely, FIGS. 2 and 3, clearly illustrate that each section abuts or is adjacent another section and is joined thereto at a connection 26, 26'. The connection is robust enough to maintain structural integrity of the tray so that the tray can be manipulated and installed as a single, integrated item.

However, for reasons described below, it can be desirable or required to separate one or more of the sections 24, 24', and 24" from the other sections of the tray. For example, the illustrated seven niche tray can be separated so that independent sections of two, three, four, or five niche trays can also be provided. The separation occurs at the connection 26, 26' which can be broken, snapped, cut, or detached to separate adjacent sections as desired. Significantly, by providing precise connection locations, specific dimensions can be factored into planning for display as described below.

In the illustrated embodiment, the connection 26, 26' is fabricated with the same material (e.g., plastic) as the tray 10, and it is readily cut with a knife or other cutting tool (not shown) that might typically found on a jobsite. Also, by providing a specific connection 26, 26' the sections 24, 24', 24" the niches 16 and reservoirs 20 are not altered or damaged, thereby retaining the functionality of holding pots 18 in place and retaining liquid. Further, while the connection is shown in association with the back portion 14, it could alternatively or additionally be associated with the base portion 12, a point in between or both.

Continuing to refer to FIG. 1, the back portion 14 of the tray 10 can define one or more apertures 28 so that fluid can escape from the tray and/or each niche 16 when a predetermined volume of fluid is exceeded.

Referring to FIG. 8, fluid 30 (shown in dotted lines), emitted from a fluid supply 32 can flow into a tray 10. When a predetermined volume of fluid is reached, the fluid 30 exits the aperture 28 and passes to the tray(s) 10 below. Either in individual trays or in a bottom level tray, a fluid sensor 31 can be provided to detect the level of fluid within the tray 10 and/or one or more niches 16. The fluid sensor 31 can simply detect the presence or absence of fluid or it can sense a fluid level. The sensor 31 can be in communication with a fluid control system 33 that is in communication with the fluid supply 32, or a control therefore, to discontinue fluid introduction when the fluid sensor detects fluid or fluid above a predetermined level. The fluid control system 33 can allow or direct excess fluid to be drained from the tray 10 or recirculated to the fluid supply 32. The fluid can be drained from the tray by providing a hole in the tray if the tray is in an outdoor installation or if a collection tray is provided below, or by providing tubing and/or plumbing as represented by the line leading from the sensor to the control system for an indoor installation.

Figure 8A:
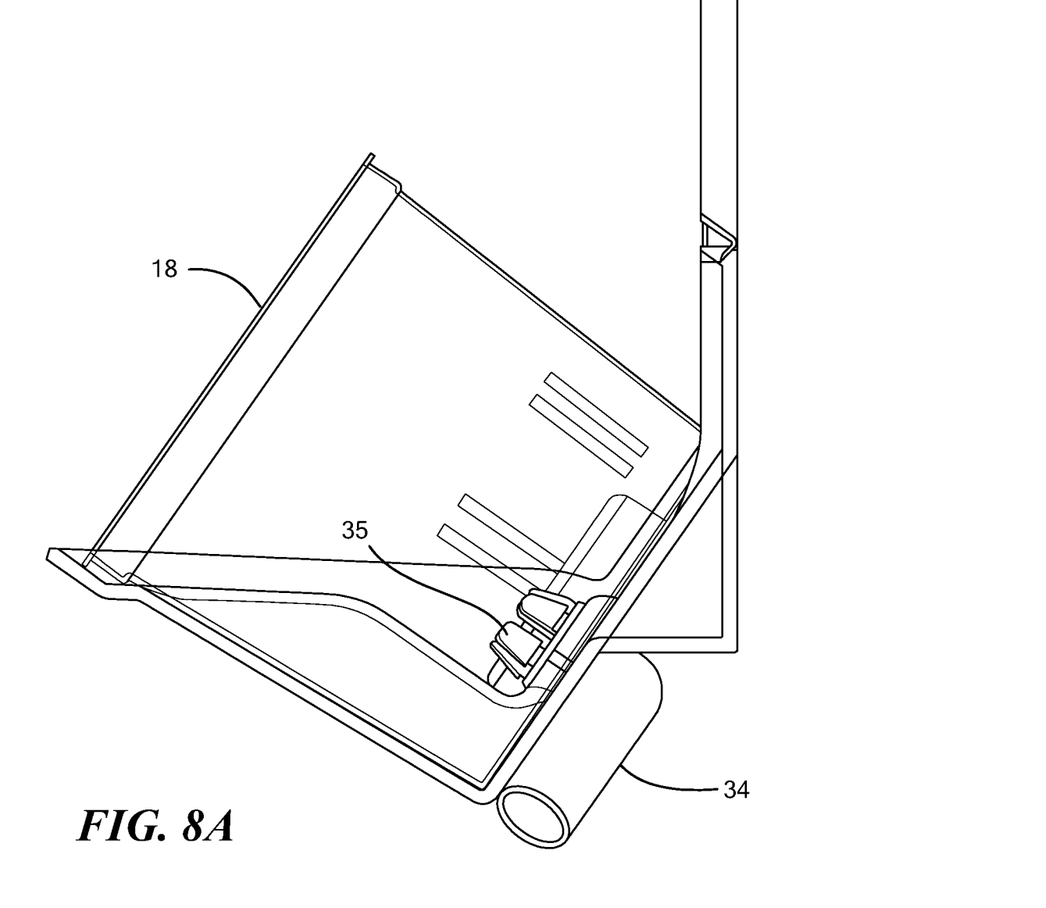
FIG. 8A is a side view of a tray mated with a fluid guide.
Figure 8B:
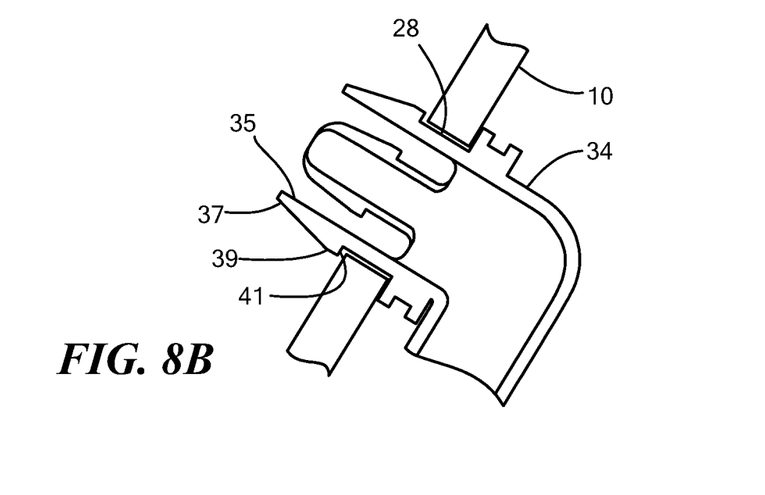
FIG. 8B is a side view of a portion of a fluid guide 34 showing a flexible tooth.

A different aspect of drainage and fluid flow control is provided by a drainage fitting or fluid guide 34 can be mated to the aperture 28 of the tray 10 to guide fluid flow. To simplify the mating, the fluid guide can be provided with flexible, resilient teeth 35, shown in FIG. 8A, that allow a "pop-in fit" when pushed through the aperture 28. The teeth 35 are shown with a tapered configuration so that a distal end 37 of each of the teeth is narrower than the base or proximal end 39 of each of the teeth, thereby facilitating insertion into the aperture 28. The proximal end 39 is provided with a lip 41 that extends beyond the boundary of the aperture 28, thereby locking the fluid guide to the tray 10. As shown, the fluid guide 34 is angled away from the back portion 14 to direct fluid 30 into a niche 16 and reservoir 20 below to inhibit fluid contact and possible leakage from the back portion.

Figure 7:
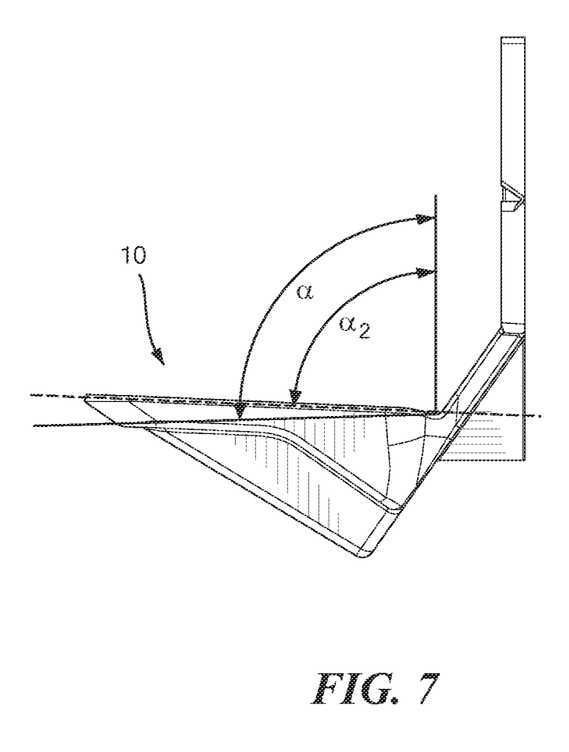
FIG. 7 is a right side view thereof.

As noted with respect to FIGS. 7 and 8, the planting tray 10 includes a base portion 12 and a back portion 14 disposed at an acute angle with respect to each other and a plane defined by the upper portion or top of the niche 16 of the base portion 12 is at an acute angle with a plane formed by the back portion 14. This helps to ensure that the pot is maintained in the tray 10. Additionally, in the event an aperture 28 and/or fluid guide 34 become clogged, a notch 43 is provided that is below the front lip of the base portion 12 to allow water to flow down the side of the tray 10 to a reservoir or catch point (not shown) and not over the front of the tray.

Additionally, fixation devices can be attached to, integrated with or defined by the tray to facilitate mounting and installation of the tray. As shown in FIG. 1, a fixation device includes one or more mounting holes 36.

Figure 9:
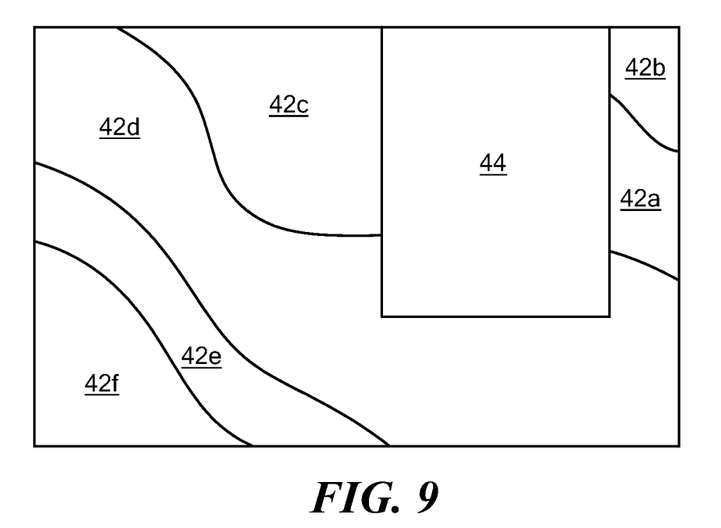
FIG. 9 is an illustration of an aesthetic layout for a green wall plant display.
Figure 10:
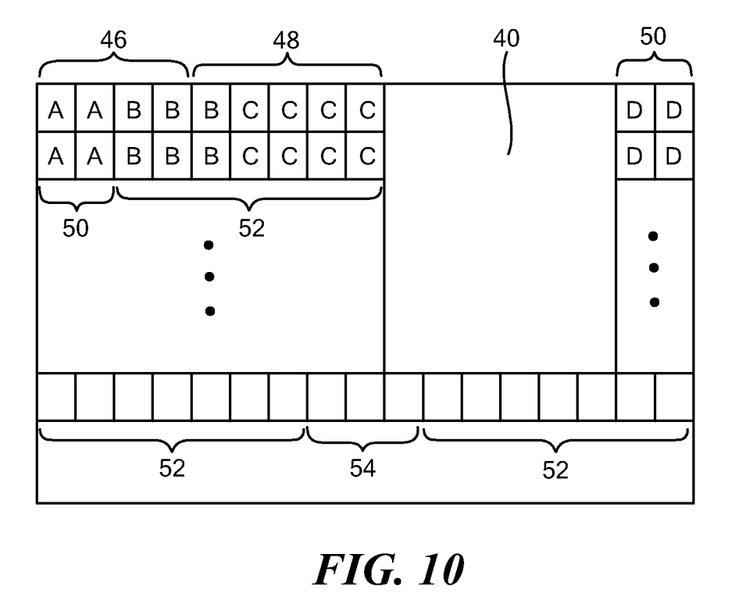
FIG. 10 is a diagram of the organization and sizing of trays, as well at the assignment of specific plants to achieve the a green wall plant display shown in FIG. 9.
Figure 11:
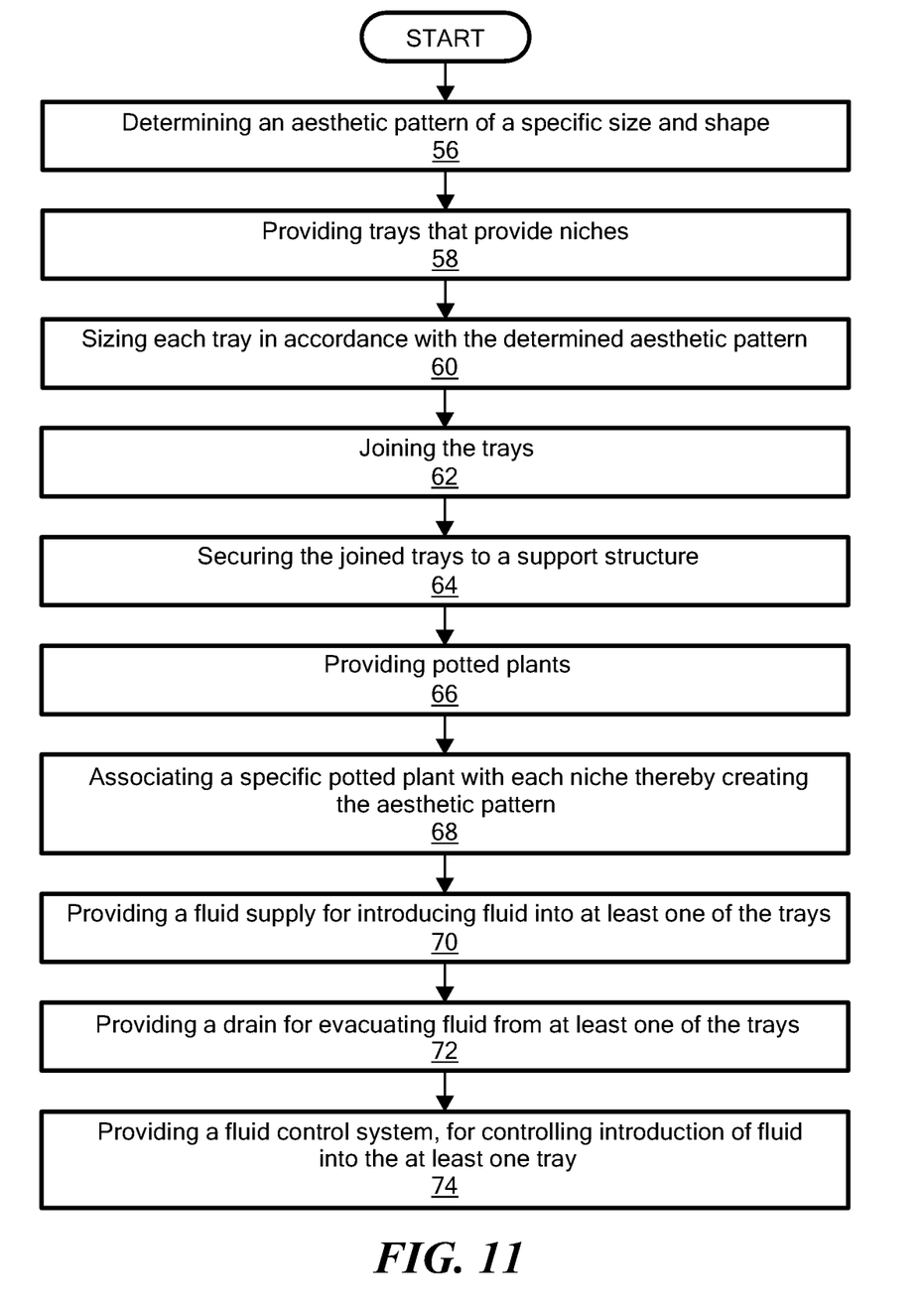
FIG. 11 is a depiction of method steps for creating the green wall plant display of FIG. 9.

FIGS. 3-7 depict the tray in various views to help understand the structure and function of the tray 10 and its features as described above, and FIG. 8 is a side view of multiple trays that are connected as described above and in which potted-plants 38 have been placed;

The advantageous features of the tray 10 are better understood by referring to FIGS. 9-11 which show the tray in the context of a system of which they can be a part to create a display, and the method of creating a display. FIG. 9 is an illustration of an aesthetic layout for a green wall plant display 40. The green wall plant display is shown on a wall portion that is to be covered with multiple trays and sections thereof and into which different varieties of potted plants are positioned in a predetermined pattern to create a desired aesthetic effect. The effect may include multiple regions 42a-42f (collectively 42) of differing surface topography, texture and color. As shown, the aesthetic effect created by the regions 42 can be incorporated with or built around other features 44 to include signage, window, structural elements (e.g., beams and supports), video monitors and the like.

In order to create the aesthetic effect, a diagram specifying the organization and sizing of trays 10, as well at the assignment of specific plants to specific regions 42 is created as shown in FIG. 10. As shown, trays have been divided to create a four niche section 46, a five niche section 48, three two niche sections 50, and a seven niche section 52 to accommodate or fit around a feature 44. The pattern is repeated as represented with dots. A lower row is show with a seven niche sections 52 and a three niche section 54. Selected plant varieties are represented by A, B, C, and D that are associated with niches as required to create the aesthetic effect.

FIG. 11 is a depiction of method steps for creating the green wall plant display of FIG. 9 and summarize the description above. The steps include a first step 56 of determining an aesthetic pattern of a specific size and shape;

a second step 58 of providing trays that define niches; a third step 60 of sizing each tray in accordance with the determined aesthetic pattern; a fourth step 62 of joining the trays; a fifth step 64 of securing the joined trays to a support structure; a sixth step 66 of providing potted plants; and a seventh step 68 of associating a specific potted plant with each niche thereby creating the aesthetic pattern.

The method can further include an eighth step 70 of providing a fluid supply for introducing fluid into at least one of the of trays; a ninth step 72 of providing a drain for evacuating fluid from at least one of the trays; and a tenth step 74 of providing a fluid control system, for controlling introduction of fluid into the at least one tray.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A vertical wall display system for displaying a plurality of potted plants, the vertical wall display system comprising:
    a plurality of trays, each tray having a base portion and a back portion disposed at an acute angle with respect to each other;
    the base portion of the tray defining a plurality of niches in a linear array for receiving a plurality of potted plants, each niche defining a reservoir capable of retaining a predetermined volume of a fluid;
    the back portion of the tray including a plurality of connecting elements for connecting the back portion of a first tray with the back portion of a second tray so that the back portion of the first tray and the back portion of the second tray are substantially co-planar;
    each of the plurality of trays defining at least two sections;
    a connection disposed between and joining adjacent back portions of the at least two sections to provide a location for separating the adjacent back portions from each other along a straight, non-perforated, cut line to reduce a number of niches in each tray; and
    a plane formed by a bottom of each niche of the base portion being disposed at an acute angle with respect to a plane formed by the back portion.

2. The vertical wall display system of claim 1, further comprising:
    a fluid supply for introducing fluid into at least one of the plurality of trays,
    a drain for evacuating fluid from at least one of the plurality of trays, and
    a fluid control system, for controlling introduction of fluid into one of the plurality of trays.

3. The vertical wall display system of claim 2, wherein the trays provide a fluid flow path from a first point to a second point.

4. The vertical wall display system of claim 3, further comprising a fluid sensor proximate the drain and in communication with the fluid control system.

5. The vertical wall display system of claim 4, wherein the fluid control system discontinues fluid introduction when the fluid sensor detects fluid flow.

6. The vertical wall display system of claim 1, further including a notch defined in a side portion of the tray below a front lip of the base portion, a plane formed by the notch being disposed at an acute angle with respect to a plane formed by an uppermost portion of the front lip.

7. A tray of a vertical wall system for displaying potted plants, comprising:
    a base portion and a back portion disposed at an acute angle with respect to each other;
    the base portion of the tray defining a plurality of niches in a linear array for receiving a plurality of potted plants, each niche defining a reservoir capable of retaining a predetermined volume of a fluid;
    the tray being divisible into at least two sections, each section having at least one niche; and
    a connection disposed between and joining adjacent back portions of the at least two sections to provide a location for separating the adjacent back portions from each other along a straight, non-perforated, cut line to reduce a number of niches in each tray.

8. The tray of a vertical wall system for displaying potted plants of claim 7, wherein the discrete sections include different numbers of niches.

9. The tray of a vertical wall system for displaying potted plants of claim 7, further including an aperture defined in the back portion of the tray so that fluid can escape from each niche when the predetermined volume of fluid is exceeded.

10. The tray of a vertical wall system for displaying potted plants of claim 9, further comprising a fluid guide matable with the aperture, the fluid guide including flexible, resilient teeth having tapered distal ends and a lip defined by a proximal end of the teeth, the proximal end of the resilient teeth extendable beyond a boundary that defines the aperture to secure the fluid guide to the tray.

11. The tray of a vertical wall system for displaying potted plants of claim 7, further comprising a notch defined in a side portion of the tray below a front lip of the base portion so that fluid can escape from the tray when a second predetermined volume of fluid is exceeded, a plane formed by the notch being disposed at an acute angle with respect to a plane formed by an uppermost portion of the front lip.

12. The tray of a vertical wall system for displaying potted plants of claim 7, wherein the at least two sections are joined, but wherein each section maintains independent structural integrity.

13. The tray of a vertical wall system for displaying potted plants of claim 7, wherein the tray has seven niches and is divisible into sections of two, three, four and five niche sections.

14. The tray of a vertical wall system for displaying potted plants of claim 7, further comprising a mounting aperture defined in the back portion of the tray.

15. A method of creating a green wall plant display comprising:
    providing a plurality of trays that define niches, each tray including:
        at least two adjacent sections each having a base portion and a back portion joined together by a connection to provide a location for separating the back portions of the at least two adjacent sections from each other along a straight, non-perforated, cut line to reduce a number of niches in each tray, the base portion of each section having at least one niche, the connection being divisible such that the at least two sections joined are separable into discrete sections;

sizing each tray in accordance with a predetermined aesthetic pattern, the predetermined aesthetic pattern being a predetermined arrangement of each tray and a plurality of potted plants;

joining the plurality of trays;

securing the joined plurality of trays to a support structure;

providing the plurality of potted plants; and associating a specific potted plant with each niche thereby creating the aesthetic pattern.

16. The method of creating a green wall plant display of claim 15, further comprising:

providing a fluid supply for introducing fluid into at least one of the plurality of trays;

providing a drain for evacuating fluid from at least one of the plurality of trays; and providing a fluid control system, for controlling introduction of fluid into one of the plurality of trays.

17. The method of a vertical wall system for displaying potted plants of claim 16, wherein the trays provide a fluid flow path from a first point to a second point.

18. The method of a vertical wall system for displaying potted plants of claim 17, wherein the first point is in a first tray mounted above a second tray.

19. The method of a vertical wall system for displaying potted plants of claim 18, comprising a fluid sensor proximate the drain and in communication with the fluid control system.

20. The method of a vertical wall system for displaying potted plants of claim 19, wherein the fluid control system discontinues fluid introduction when the fluid sensor detects fluid flow.

* * * * *